United States Patent
Ackley et al.

(10) Patent No.: US 6,375,075 B1
(45) Date of Patent: Apr. 23, 2002

(54) METHOD AND APPARATUS FOR READING MACHINE-READABLE SYMBOLS INCLUDING COLOR SYMBOL ELEMENTS

(75) Inventors: H. Sprague Ackley, Seattle; Richard Steward Penn, Issaquah, both of WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/419,534

(22) Filed: Oct. 18, 1999

(51) Int. Cl.[7] .................................................. G06K 7/10
(52) U.S. Cl. .......................... 235/462.04; 235/462.35; 235/469; 235/462.45; 235/468
(58) Field of Search ....................... 235/462.04, 462.35, 235/469, 462.45, 468

(56) References Cited

U.S. PATENT DOCUMENTS

| | | | | |
|---|---|---|---|---|
| 5,438,187 A | * | 8/1995 | Reddersen et al. ......... 235/462 |
| 5,576,528 A | * | 11/1996 | Chew et al. ................ 235/469 |
| 5,714,745 A | * | 2/1998 | Ju et al. ..................... 235/462 |
| 6,042,013 A | * | 3/2000 | Fork .......................... 235/469 |
| 6,073,851 A | * | 6/2000 | Olmstead et al. ...... 235/462.45 |

OTHER PUBLICATIONS

U.S. Patent Application No. 09/420,610, filed Oct. 18, 1999.

* cited by examiner

*Primary Examiner*—Michael G. Lee
*Assistant Examiner*—Allyson Sanders
(74) *Attorney, Agent, or Firm*—Seed IP Law Group, PLLC

(57) ABSTRACT

A symbol reader employs an optical element having first and second optical axes positioned to image a same portion of a color coded symbol onto two different portions of an image sensor. The reader includes one or more filters to remove different color portions of the light reflected from the symbol to create color separations at the image sensor. Thus, the image sensor detects different intensities of light, corresponding to different color states. A comparator, such as a microprocessor, programmed general purposed computer, or digital logic circuit, can determine the position and color of the various symbol elements based on image data produced by the image sensors, and decode the color coded symbol.

25 Claims, 7 Drawing Sheets

ID# 6,375,075 B1

METHOD AND APPARATUS FOR READING MACHINE-READABLE SYMBOLS INCLUDING COLOR SYMBOL ELEMENTS

TECHNICAL FIELD

This invention relates to the field of automatic data collection ("ADC"), and more particularly to automatic data collection employing color machine-readable symbols selected from a color symbology.

BACKGROUND OF THE INVENTION

A variety of methods exist for tracking and providing information about items. For example, inventory items typically carry printed labels providing information such as serial numbers, price, weight, and size. Some labels include data carriers in the form of machine-readable symbols that can be selected from a variety of machine-readable symbologies, such as barcodes, area or matrix codes, and stacked codes. The amount of information that the symbols can contain is typically limited by the space constraints of the label. These symbologies typically rely on patterns of light and dark symbol elements to encode data. For example, barcode symbologies employ patterns of alternating dark elements (e.g., bars) and light symbol elements (e.g., spaces). Information is encoded in the width of the alternating bars and spaces. The use of only two types of symbol elements (i.e., light and dark) limits the amount of information that can be encoded in a symbol of a given length (density).

The use of color and/or shading has been proposed to increase the information density of machine-readable symbols. Such color symbologies have yet to realize significant commercial success, at least partially due to technological problems associated with reading color symbols. Attempts to read color symbols have relied on two-dimensional video charge coupled devices as color image sensors. Such devices read color in sequential steps, limiting such readers to fixed mount reading devices. Fixed mount readers are not practical in a large variety of applications that require mobility, and thus place undue limitations on the use and commercial acceptance of color machine-readable symbologies.

SUMMARY OF THE INVENTION

Under one aspect of the invention, a symbol reader employs an optical element having first and second optical axes positioned to image a same portion of a color coded symbol onto two different portions of an image sensor. The reader includes one or more filters to remove or reduce different color portions of the light reflected from the symbol to create color separations at the image sensor. Thus, a yellow colored filter reduces the blue color component from the reflected light so that the image sensor detects the red and green color components. Similarly, a red colored filter reduces the green color component so that the associated image sensor principally detects the red and blue color components. A comparator, such as a microprocessor, programmed general purposed computer, or digital logic circuit, can determine the position and color of the various symbol elements based on image data produced by the image sensors, and decode the color coded symbol.

BRIEF DESCRIPTION OF THE DRAWINGS

In the drawings, identical reference numbers identify similar elements or acts. The sizes and relative positions of elements in the drawings are not necessarily drawn to scale. For example, lines representing field-of-view are shown separated by space to make the lines distinguishable, even when the fields-of-view are coincident. The shapes of the various illustrated optical elements do not necessarily represent any particular optical element. For example, while lenses are drawn as convex, some embodiments the lenses can be convex, or compound lenses. Further, many optical elements, lines and angles are arbitrarily enlarged and positioned to improve drawing legibility.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with symbol readers, optics, image sensors, verifiers, decoders, and microprocessors have not been shown or described in detail to avoid unnecessarily obscuring descriptions of the embodiments of the invention.

The headings provided herein are for convenience only and do not interpret the scope or meaning of the claimed invention.

Reading Color Machine-Readable Symbols

Figure 1:
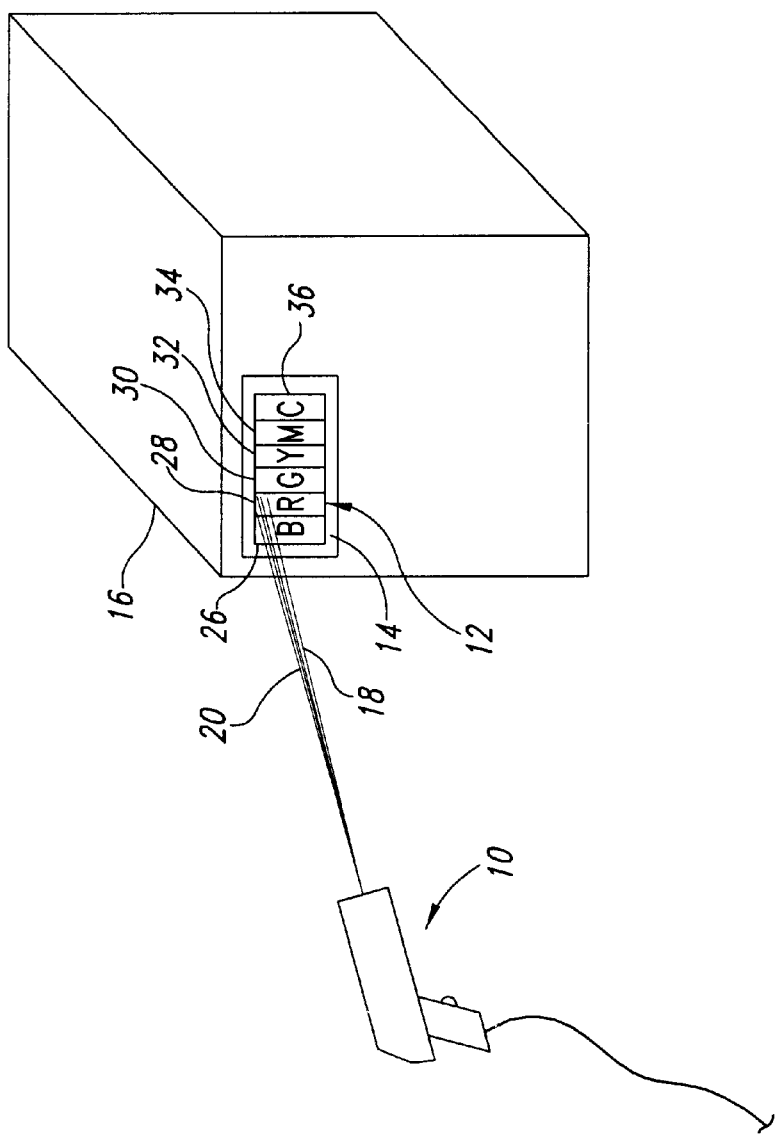
FIG. 1 is an isometric view of a symbol reader reading a machine-readable symbol composed of a number of color symbol elements.

FIG. 1 shows a hand-held symbol reader 10 reading a color machine-readable symbol 12 printed on a tag 14 that is carried on a container or item 16. The reader 10 has at least first and second fields-of-view 18, 20, respectively. The fields-of-view 18, 20 are shown separately in FIG. 1 for legibility of presentation, although in practice the fields-of-view are approximately coincident on at least a first portion of the symbol 12.

A number of color elements 26–36 form the color symbol 12. For example, the color symbol 12 of FIG. 1 includes blue 26, yellow 28, red 30, green 32, white 34, and red 36 bars. (For ease of presentation, the color of each bar is represented by a letter, where B stands for blue, Y stands for yellow, R stands for red, G stands for green, and W stands for white. In use, the symbol elements 26–36 employ the actual colors, and the letters typically do not appear on the symbol 12.) The particular color machine-readable symbol 12 shown in FIG. 1 is not intended to represent any particular symbol from any particular symbology, and the invention is not limited to any particular color symbology or physical aspects of a particular symbology. For example, the symbol 12 can employ fixed width bars, instead of the varying width color bars 26–36 shown in FIG. 1. Additionally, or alternatively, the symbol 12 can employ geometrical shapes other than bars, such as hexagons, octagons, dots, squares, or arbitrary shapes. Further, the color symbol 12 can employ fewer or greater number of colors, or different colors than those shown and discussed.

Hand-Held Symbol Reader Having Furcated Lens And Area Image Sensor

Figure 2:
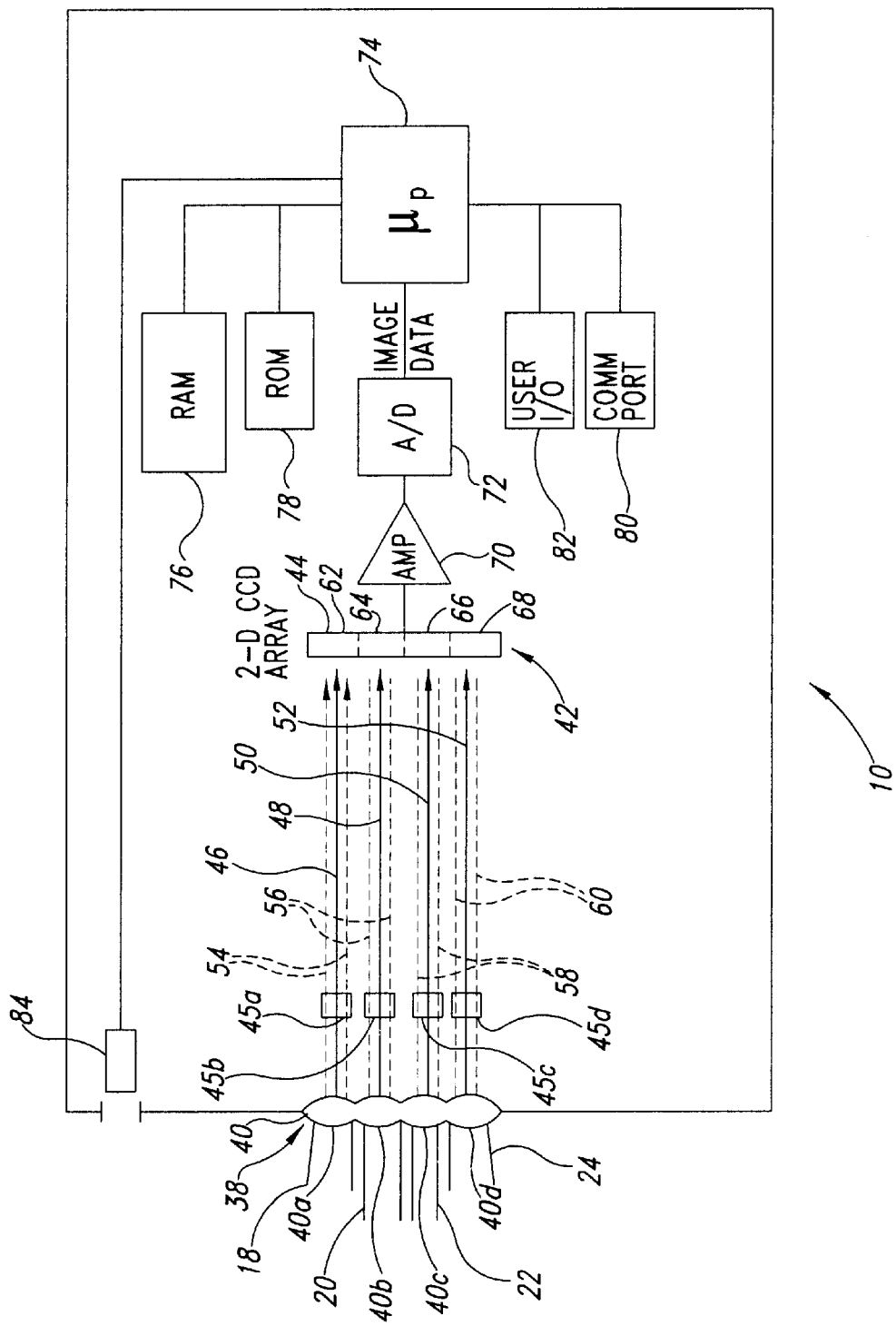
FIG. 2 is a partial schematic, partial functional block diagram of a reader according to one illustrated embodiment, of a reader employing a furcated lens and area image sensor.

FIG. 2 shows the various components of one illustrated embodiment of the hand-held symbol reader 10 for reading the color machine-readable symbol 12. An optical element 38, such as a divided or furcated optical lens 40, directs light reflected from the color symbol 12 to an image sensor 42, such as a two-dimensional charge coupled device ("CCD") array 44. The reflected light is filtered to produce a number of color separated images on the two-dimensional CCD array 44.

The furcated optical lens 40 shown in FIG. 2 is similar in some respects to the commonly known "bifocals lens." (The shapes of the furcated lens 40 in the cross-section of the furcated lens 40 have been exaggerated to demonstrate the furcated nature of the surfaces of the optical element 38.) In this respect, a single optical element is ground to have multiple optical axes. For example, the furcated lens 40 in FIG. 2 is ground to have first, second, third and fourth optical axes 46–52, respectively. As used herein, the term optical axis refers to a center line or path of an image field of an optical component such as an optical lens. For example, the optical axis 46 is the center-line or path of the image field 54 associated with a respective portion 40A, of the furcated lens 40. Similarly, optical axes 48, 50, 52 are the centerlines or paths of the image fields 56, 58, 60, associated with respective portions 40B, 40C, 40D of the furcated lens 40, respectively. In contrast to the typical bifocal lens, each portion 40A–40D of the furcated lens 40 has an approximately equal focal length.

The furcated lens 40 shown in FIG. 2 has first, second, third and fourth fields-of-view 18–24, respectively. The fields of view 18–24 are shown separately for clarity of presentation, however the fields-of-view 18–24 are approximately coincident at the symbol 12 (e.g., on a same symbol element 26–36). In other words, the furcated lens 40 is ground such that the respective fields-of-view 18–24 image or reflect an approximately same portion of the symbol 12 at a same time. The amount of coincidence will depend on the resolution required to read the symbol 12, which is in part a function of the size of the smallest symbol element 26–36. This is in contrast to the typical bifocal lens that has different fields-of-view for different portions of the optical lens (e.g., the bi-focal wearer typically looks up to view distant objects, and down to view close objects, such as reading material). Typically, each of the fields-of view 18–24 will image the entire symbol 12, rather than a portion of the symbol 12.

The two-dimensional CCD array 44 is logically partitioned into four portions 62, 64, 66, 68 (indicated by broken lines), the image fields 54–60 of the furcated optical lens 40 imaging on the distinct portions 62–68 of two-dimensional CCD array 44. The two-dimensional CCD array 44 produces analog electrical signals corresponding to the pattern of regions of varying reflectance forming the symbol 12. An amplifier 70 amplifiers the analog electrical signal, and an analog-to-digital ("A/D") converter 72 coverts the amplified analog signals into digital image data.

Filters 45A, 45B, 45C, 45D filter the reflected light to remove or reduce respective undesired color components before the light reaches the two-dimensional CCD array 44. In the embodiment illustrated in FIG. 2, the filters 45A–45D are between the furcated lens 40 and the two-dimensional CCD array 44. Optical filters do not remove the same color component of light as the color that the filter appears. For example, a filter that appears yellow, actually removes the blue color component from white light. Removing the blue color component leaves the red and green components, which combine to produce the color yellow, and hence the yellow appearance of the filter. Thus, reference to "first color filter and the second color filter" in the specification and claims is not intended to imply a correspondence between the naming convention and the color passed, removed or reduced by the filter. In this usage, "first" and "second" refer to the components themselves, not the colors operated on by the components. The results of the filtering is a number of color separated images of the symbol 12, each image formed on a portion 62–68 of the two-dimensional CCD array 44.

A processor, such as a microprocessor 74, controls the operation of the reader 10 and the decoding of the image data. Other devices can control the operation of the reader 10, for example a programmed computer such as a programmed personal computer (not shown). The reader 10 can additionally, or alternatively rely on other comparator circuits to decode the image data such as a dedicated digital signal processing ("DSP") processor (not shown). The microprocessor 74 employs a random access memory ("RAM") 76 to execute instructions stored in a read-only memory ("ROM") 78. The microprocessor 74 can control a communications port 80 to provide communications between the reader 10 and an external device (not shown). The reader 10 can receive commands and data from a user interface (not shown) through a user input/output ("I/O") port 82 to allow control of the reader 10. The reader 10 can illuminate the symbol 12 with light from a light source, such as a light emitting diode ("LED") 84, incandescent light or other diffuse light source, or the reader 10 can alternatively rely on ambient light. The reader 10 can also employ a laser for illuminating the symbol 12 if the reader 10 includes a suitable image sensor 32, such as a photo detector (not shown).

Hand-Held Symbol Reader With Scanning Mechanism

Figure 3:
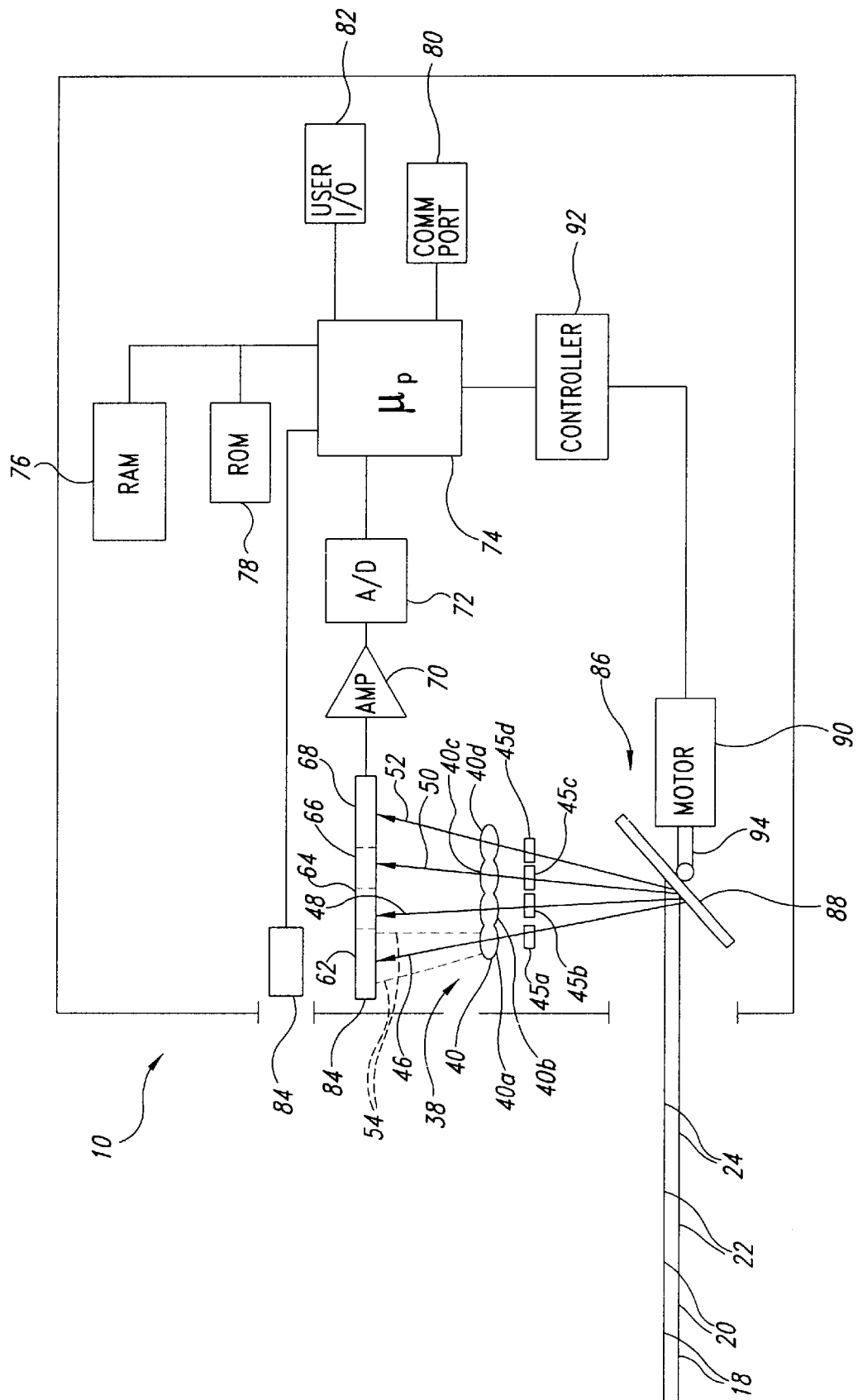
FIG. 3 is a partial schematic, partial functional block diagram of a reader according to an alternative illustrated embodiment employing a reflector and an alternative filter position.

FIG. 3 shows an alternative embodiment of the present invention. This alternative embodiment, and those alternative embodiments and other alternatives described herein, are substantially similar to previously described embodiments, and common acts and structures are identified by the same reference numbers. Only significant differences in operation and structure are described in detail below.

The reader 10 includes a reflector 88 positioned to reflect the approximately coincident fields-of-view 18–24 (shown overlapped) of the furcated lens 40 across the symbol 12, as is generally known in symbol reading arts. In the embodiment illustrated in FIG. 3, the filters 45A–45D are between the furcated lens 40 and the symbol 12.

Hand-Held Symbol Reader Discrete Lenses and Image Sensors

Figure 4:
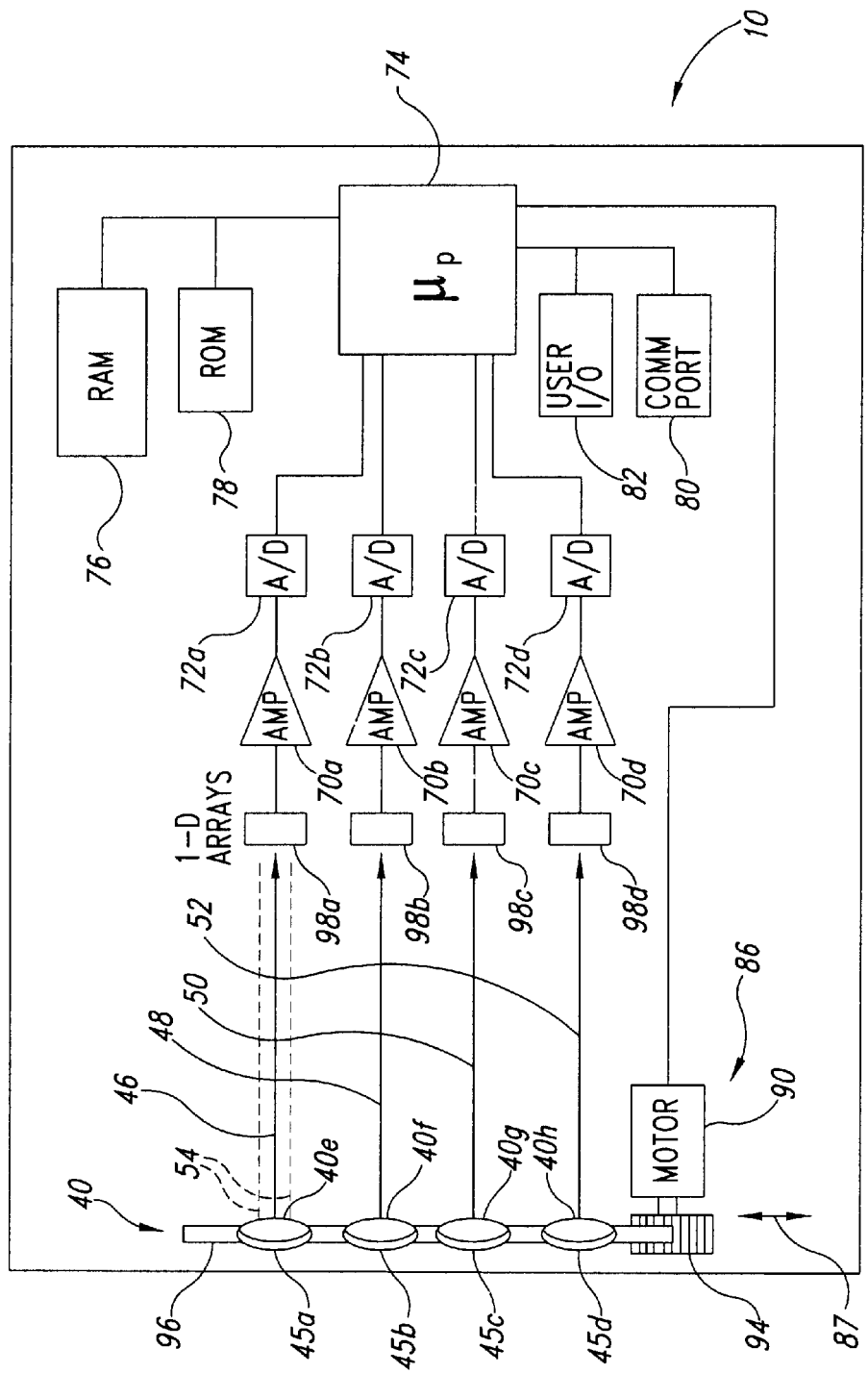
FIG. 4 is a partial schematic, partial functional block diagram of a reader according to an alternative illustrated embodiment employing discrete lenses and image sensors.

FIG. 4 shows another alternative embodiment of the present invention including an alternative optical element 38 and image sensor 42. The optical element 38 includes a frame 96 and a number of discrete lenses 40E, 40F, 40G, 40H. The image sensor 42 includes a number of discrete images sensors, such as first 98A, second 98B, third 98C and fourth 98D one-dimensional CCD arrays.

As discussed above, the fields-of-view 18–24 of the discrete lenses 40E–40H are approximately coincident on the symbol 12. Each of the discrete lenses 40E–40H has an optical axis 46–52, respectively, where the optical axes 46–52 are aligned with respective ones of the linear CCD arrays 98A–98D to focus an image onto the respective linear CCD array 98A–98D.

The linear CCD arrays 98A–98D each produce an analog signal. Amplifiers 70A–70D, amplify the respective analog signals, and A/D converters 72A–72D convert the respective amplified analog signals into sets of digital image data for processing by the microprocessor 74.

In the embodiment illustrated in FIG. 4, the filters 45A–45D are formed as optical films on the surfaces of the discrete lenses 40E–40F. Forming the filters 45A–45D as films on the surface of the discrete lenses 40E–40H simplifies manufacturing and assures that the filters 45A–45D are in alignment with the optical axes 46–52 and the linear CCD arrays 98A–98B.

Figure 5:
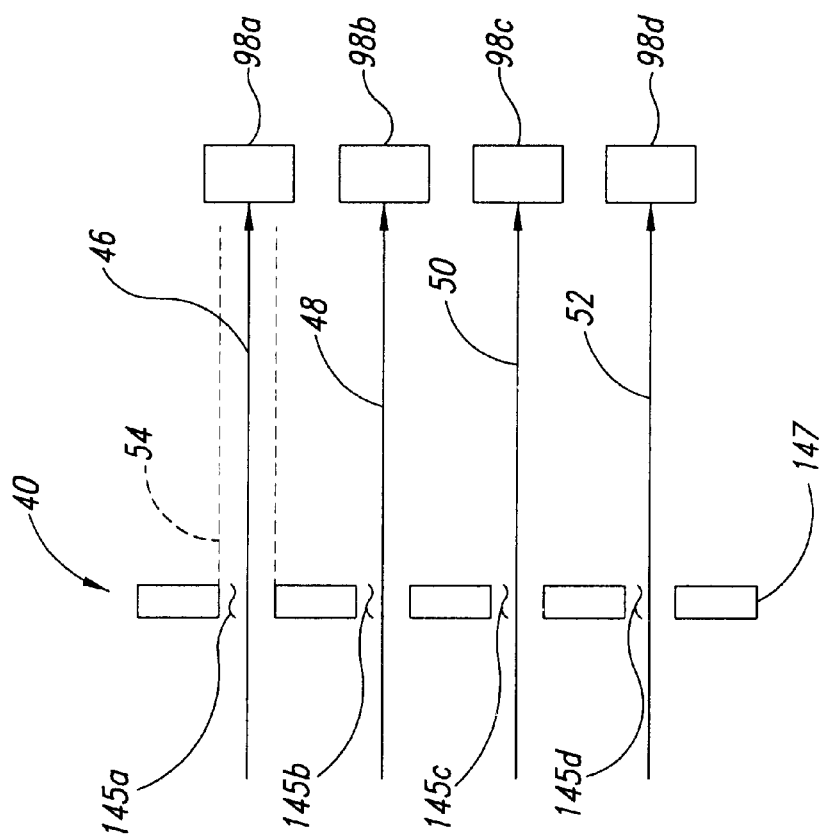
FIG. 5 is a side elevational view of an optical element including a number of apertures and a respective image sensor.

FIG. 5 shows another alternative embodiment where a number of apertures 145A–D in a diaphragm 147 form the optical element 40

Method of Operating

Figure 6:
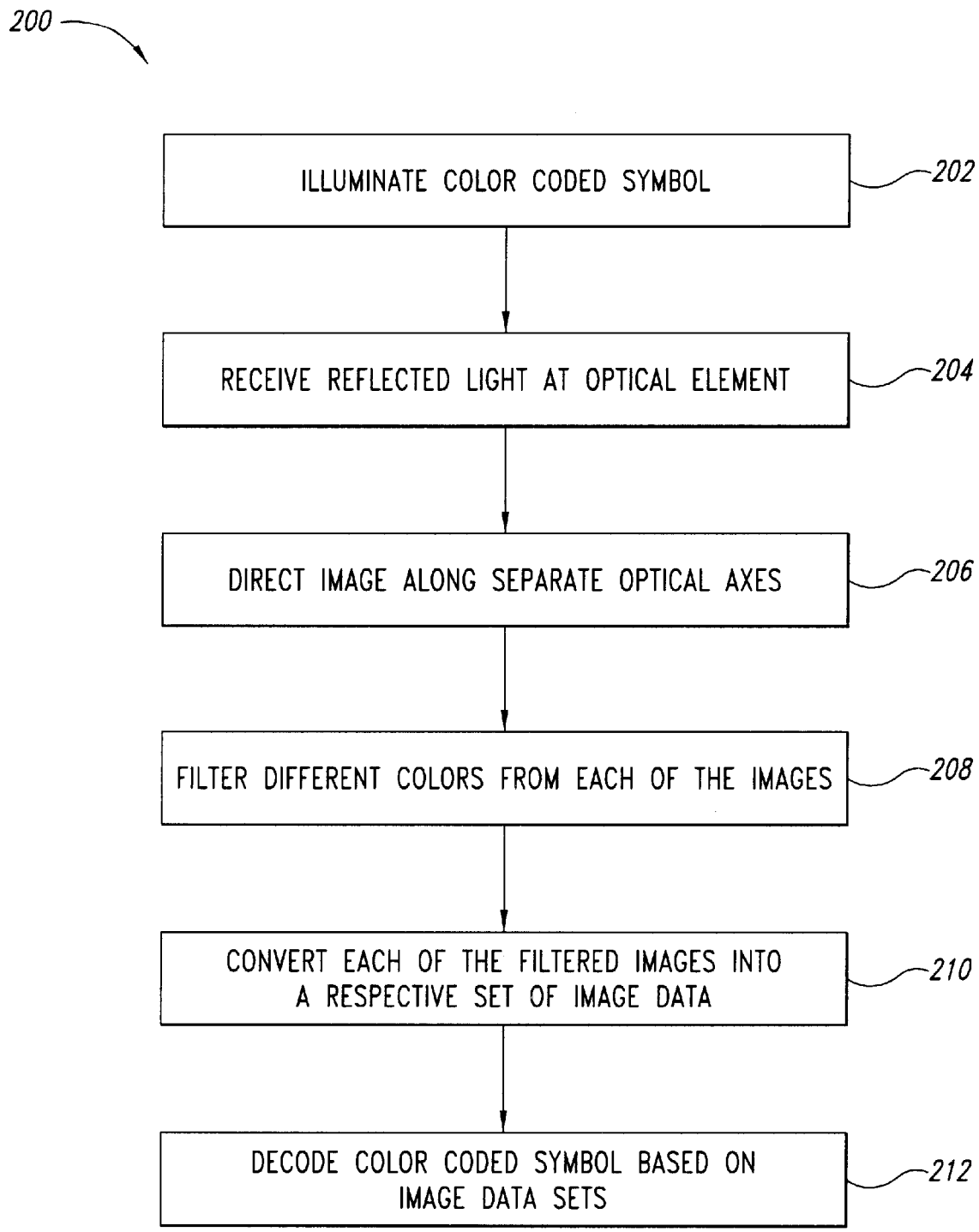
FIG. 6 is a flowchart of a method of reading a color coded symbol.

FIG. 6 illustrates a method 200 of reading color symbols 12 with the hand-held symbol reader 10 (FIGS. 1 and 2). As described, the method 200 includes some optional steps, and omits other steps that the hand-held reader 10 can employ in reading the color symbol 12. While the method 100 is described with respect to the reader 10 of FIGS. 1 and 2, the readers of FIGS. 3–5 are operated according to similar steps.

In step 202, the reader 10 illuminates the symbol 12 with light from the LED 84. In step 204, the reader 10 receives light reflected from the symbol 12 at the optical element 38, which in FIG. 2 is the furcated lens 40. In step 206, the furcated lens 40 directs first, second, third and fourth images of the symbol 12 along the first, second, third and fourth optical axis, respectively to separate the images. In step 208, the images pass through respective filters 45A–45D to create color separations.

Figure 7:
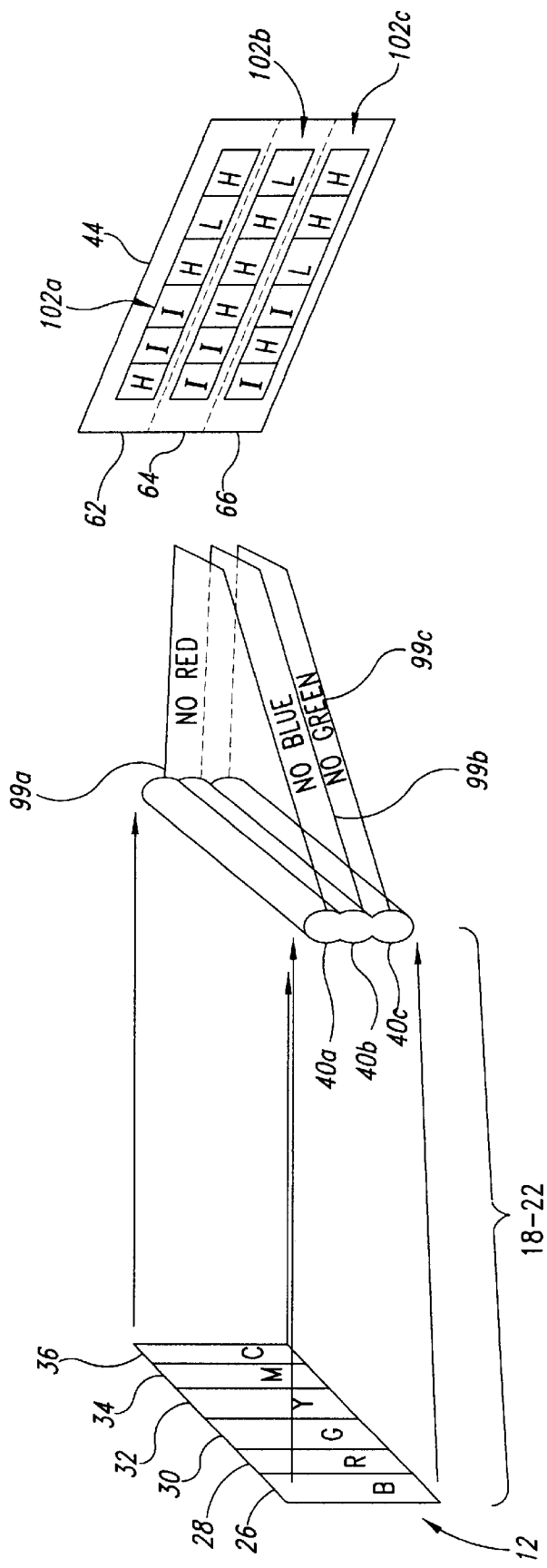
FIG. 7 is an isometric view of a multi-optical axis optical component performing a color separation on light reflected from a color symbol.

FIG. 7 shows an example of three color separated images 102A–102C, imaging on the respective portions 62–66 of the two-dimensional CCD array 44. Separate filters 45A–45B are omitted in favor of suitably doped furcated lens 40. The various portions 40A–40C of the lens 40 are doped with respective dopant filter materials, such that each portion removes or reduces a respective color component from the reflected light. Thus, the doped first portion 40A of the furcated lens 40 can filter the red component from the reflected light, passing the other color components 99A. Similarly, the doped second and third portions 40B, 40C of the furcated lens 40 can filter the blue and green components of the reflected light, respectively, passing the other color components 99B, 99C, respectively. A fourth portion 40D, not shown, of the furcated lens 40 can be undoped so as to pass all color components of the reflected light (e.g., white light) pass through to the two-dimensional CCD array 44. The portions 62–66 of the two-dimensional CCD array 44 perceive the color separated images 102A–102C as varying intensities of light, corresponding to three or more states. As shown in FIG. 7, the letter "H" stands for a high state, the letter "I" for an intermediate state, and the letter "L" for a low state. The high, intermediate and low states corresponds to varying intensities of light.

Returning to FIG. 6, in step 210, the two-dimensional CCD array 44, amplifier 70 and A/D converter 72 convert the color separated images 102A–102C98 into first, second, third and fourth sets of image data for processing by the microprocessor 74. In step 212, the symbol 12 is decoded based on the sets of image data. For example, the microprocessor 74 can identify the physical characteristics (e.g., color, position, width, height) of the various elements 26–36 forming the symbol 12. The microprocessor 74 can decode the symbol 12 based on the physical characteristics of the symbol elements 26–36 using lookup tables stored in the ROM 78, or by executing a decode algorithm, as is generally known in the machine-readable arts. Alternatively, the microprocessor 74 can create a digitized image in RAM 76, overlaying images from each set of image data, before identifying the physical characteristics of the various symbol elements 26–36 and decoding the symbol 12. Similar processing is described in commonly assigned U.S. patent applications Ser. No. 09/420,610 filed Oct. 18, 1999, and entitled "METHOD AND APPARATUS FOR SCANNING COLOR SYMBOLS" and Ser. No. 09/481,837 filed Jan. 12, 2000, and entitled "MACHINE-READABLE COLOR SYMBOLOGY AND METHOD AND APPARATUS FOR READING SAME WITH STANDARD READERS SUCH AS LASER SCANNERS". The fields-of-view 18–24 of the furcated lens 40 should be coincident on a same symbol element 26–36 such that the comparator (e.g., microprocessor 74) is comparing like sets of image data. That is, the comparator is comparing image data corresponding to light reflected from a same symbol element 20–24 and filtered through the respective filters 45A–45D.

Although specific embodiments of and examples for the reader and method of the invention are described herein for illustrative purposes, various equivalent modifications can be made without departing from the spirit and scope of the invention, as will be recognized by those skilled in the relevant art. The teachings provided herein of the invention can be applied to readers for any machine-readable symbology, not necessarily the exemplary color bar code reader generally described above. The hand-held reader can also include additional components for optically manipulating the images, such as lenses, beam splitters, polarization filters, apertures and additional focusing optics. The reader can employ image sensors other than CCD arrays, such as Vidicon and Plumbicon imaging tubes. Further, the reader can employ simple digital logic circuits as the comparator.

The various embodiments described above can be combined to provide further embodiments. All of the above U.S. patents, patent applications and publications referred to in this specification are incorporated by reference. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all symbol readers that operate in accordance with the claims to read color machine-readable symbols. Accordingly, the invention is not limited by the disclosure, but instead its scope is to be determined entirely by the following claims.

We claim:

1. A symbol reader to read machine-readable symbols having more than two different colors, the symbol reader comprising:

a first optical lens having a first optical axis, the first optical lens positionable to image at least a first portion of a symbol at a first time;

a second optical lens having a second optical axis, different from the first optical axis, the second optical lens positionable to image at least the first portion of the symbol at the first time;

an image sensor having at least a first portion aligned with the first optical axis and a second portion aligned with the second optical axis;

a first color filter positioned along the first optical axis before the image sensor to substantially remove a respective color component from light reflected from the at least first portion of the symbol before the light reaches the image sensor; and a second color filter positioned along the second optical axis before the image sensor to substantially remove a respective color component from light reflected from the at least first portion of the symbol before the light reaches the image sensor.

2. The symbol reader of claim 1, further comprising:

a comparator coupled to receive image data from the first portion of the image sensor and the second portion of the image sensor.

3. The symbol reader of claim 1, further comprising:

a comparator coupled to the image sensor to receive image data corresponding to light passing through the first color filter and image data corresponding to light passing through the second color filter.

4. A symbol reader to read machine-readable symbols having more than two different colors, comprising:

a first optical lens having a first field of view and a first image field;

a second optical lens having a second field of view and a second image field, the second field of view coincident with the first field of view and the second image field different from the first image field;

an image sensor having at least a first portion and a second portion, the first portion aligned with the first image field and the second portion aligned with the second image field;

a first color filter positioned before the image sensor to remove a first color component of light in the first image field; and a second color filter positioned before the image sensor to remove a second color component of light in the second image field.

5. The symbol reader of claim 4 wherein the image sensor comprises a first linear charge coupled device and a second linear charge coupled device.

6. The symbol reader of claim 4 wherein the first and the second optical lenses comprises a number of corresponding surfaces formed on a single optical component.

7. The symbol reader of claim 4, further comprising:

a processor coupled to receive image data from the first portion of the image sensor and the second portion of the image sensor and programmed to compare the image data from the first and second portions of the image sensor to identify respective colors.

8. A reader to read color symbols, comprising:

an optical element having at least a first optical axis and a second optical axis;

an image sensor having a first portion positioned along the first optical axis and a second portion position along the second optical axis;

a first color filter positioned along the first optical axis to substantially remove a first color of light; and a second color filter positioned along the second optical axis to substantially remove a second color of light.

9. The reader of claim 8 wherein the optical element includes a first lens and a second lens.

10. The reader of claim 8 wherein the optical element includes a first reflector and a second reflector.

11. The reader of claim 8 wherein the optical element includes a first aperture and a second aperture.

12. The reader of claim 8 wherein the image sensor includes a two-dimensional charge coupled device logically partitioned into the first and the second portions.

13. The reader of claim 8 wherein the first portion of the image sensor includes a first linear charge coupled device and the second portion of the image sensor includes a second linear charge coupled device.

14. The reader of claim 8 wherein the first color filter is positioned between the optical element and the image sensor.

15. The reader of claim 8 wherein the first color filter comprises an optical coating on the optical element.

16. The reader of claim 8 wherein the optical element has a third optical axis and a fourth optical axis, and further comprising:

a third color filter positioned along the third optical axis to substantially remove a third color of light different from the first and the second colors of light.

17. The reader of claim 8, further comprising:

a processor coupled to receive image data from the first portion of the image sensor corresponding to symbol elements other than symbol elements of the first color, and coupled to receive image data from the second portion of the image sensor corresponding to symbol elements including symbol elements of the first color.

18. A reader to read machine-readable symbols, comprising:

a light sensing means having at least a first portion and a second portion for sensing a first color of light reflected from at least a first portion of a symbol and a second color of light reflected from the at least first portion of the symbol, respectively;

optical means for focusing an image of the at least first portion of the symbol onto each of the first portion and the second portion of the light sensing means at a first time;

optical filtering means for substantially optically removing a first color from the image focused on the first portion of the light sensing means without removing the first color from the image focused on the second portion of the light sensing means; and comparison means for comparing image data from the first portion of the light sensing means with image data from at least the second portion of the light sensing means to identify at least three colors in the symbol.

19. The reader of claim 18 wherein the optical means includes a first lens and a second lens.

20. The reader of claim 18 wherein the light sensing means includes a first linear light sensor array and a second linear light sensor array.

21. The reader of claim 18 wherein the light sensing means includes a two-dimensional light sensor array.

22. A method of operating a reader to read machine-readable symbols, comprising:

directing a first image of at least a first portion of a color machine-readable symbol along a first optical path at a first time;

directing a second image of the at least first portion of the color machine-readable symbol along a second optical path at the first time;

filtering a first color from the first image at the first time;

filtering a second color from the second image at the first time;

converting the filtered first image into a first set of image data;

converting the second image into a second set of image data; and identifying colors in the color machine-readable symbol based on the first and the second sets of image data.

23. The method of claim 22, further comprising:

directing a third image of at least a first portion of the color machine-readable symbol along a third optical path at the first time;

converting the filtered third image into a third set of image data; and identifying an additional color in the color machine-readable symbol based on the third set of image data.

24. The method of claim 22 wherein identifying colors in the color machine-readable symbol includes comparing the first set of image data with the second set of image data.

25. The method of claim 22 wherein identifying colors in the color machine-readable symbol includes creating a digital representation in a computer readable memory overlaying the first set of image data and the second set of image data.

* * * * *